United States Patent
Handler et al.

(10) Patent No.: US 7,458,205 B2
(45) Date of Patent: Dec. 2, 2008

(54) METHOD FOR OPERATING AN INTERNAL COMBUSTION ENGINE AND DEVICE FOR IMPLEMENTING THE METHOD

(75) Inventors: Torsten Handler, Stuttgart (DE); Dirk Samuelsen, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 6 days.

(21) Appl. No.: 11/378,170

(22) Filed: Mar. 16, 2006

(65) Prior Publication Data

US 2006/0207244 A1 Sep. 21, 2006

(30) Foreign Application Priority Data

Mar. 21, 2005 (DE) .................. 10 2005 012 943

(51) Int. Cl.
*F01N 3/00* (2006.01)
(52) U.S. Cl. .................. 60/295; 60/274; 60/276; 60/285; 60/286; 60/297; 60/301
(58) Field of Classification Search .................. 60/274, 60/276, 277, 285, 286, 295, 297, 301
See application file for complete search history.

(56) References Cited

U.S. PATENT DOCUMENTS

| | | | | |
|---|---|---|---|---|
| 6,463,733 B1 * | 10/2002 | Asik et al. | .................. | 60/276 |
| 6,477,833 B2 * | 11/2002 | Tayama et al. | .................. | 60/285 |
| 6,594,989 B1 * | 7/2003 | Hepburn et al. | .................. | 60/286 |
| 6,629,408 B1 * | 10/2003 | Murakami et al. | .................. | 60/277 |
| 6,834,497 B2 * | 12/2004 | Miyoshi et al. | .................. | 60/277 |
| 6,862,880 B2 * | 3/2005 | Schnaibel et al. | .................. | 60/295 |
| 7,054,734 B2 * | 5/2006 | Todoroki et al. | .................. | 701/105 |
| 7,111,451 B2 * | 9/2006 | Dou et al. | .................. | 60/285 |
| 7,168,243 B2 * | 1/2007 | Endicott et al. | .................. | 60/295 |

FOREIGN PATENT DOCUMENTS

| | | |
|---|---|---|
| DE | 197 55 600 | 7/1999 |
| DE | 198 13 381 | 10/1999 |

OTHER PUBLICATIONS

"Otto-Motor-Management"/Bosch, Verlag vieweg, 1.Auflage, 1998, S. 22-23.

\* cited by examiner

*Primary Examiner*—Binh Q. Tran
(74) *Attorney, Agent, or Firm*—Kenyon & Kenyon LLP

(57) ABSTRACT

A method for operating an internal combustion engine, in whose exhaust region, in the direction of flow of the exhaust gas, there are situated a first broadband lambda sensor which makes available a first lambda signal, an NOx adsorption catalyst and a second broadband lambda sensor which makes available a second lambda signal, in which the NOx adsorption catalyst cyclically stores the NOx emissions of the internal combustion engine, and is regenerated within the scope of a nominal regeneration by the operation of the internal combustion engine using a rich/stoichiometric air/fuel mixture, and a device for carrying out the method are provided. An intensified regeneration, compared to a nominal regeneration, of the NOx adsorption catalyst is undertaken, which supports a better setting of the thermodynamic equilibrium in the exhaust gas compared to the nominal regeneration. At the end of the intensified regeneration, at a still rich/stoichiometric air/fuel mixture, a plausibility check/correction of the first lambda signal using the second lambda signal is provided.

10 Claims, 3 Drawing Sheets

METHOD FOR OPERATING AN INTERNAL COMBUSTION ENGINE AND DEVICE FOR IMPLEMENTING THE METHOD

FIELD OF THE INVENTION

The present invention relates to a method for operating an internal combustion engine, in whose exhaust gas region, in the direction of flow of the exhaust gas, there are situated a first broadband lambda sensor, an NOx adsorption catalyst and a second broadband lambda sensor, in which the NOx adsorption catalyst cyclically stores the NOx emissions of the internal combustion engine and is regenerated, and relates to a device for implementing the method.

BACKGROUND INFORMATION

A method for operating an internal combustion engine is described in German Patent Application No. DE 198 13 381, in which fuel is injected either in a first operating mode or in a second operating mode. In the first operating mode, a so-called stratified operation is provided, and in the second operating mode, a so-called homogeneous operation is provided. Stratified operation is used especially for small loads, whereas homogeneous operation comes into use for greater loads. During the stratified operation, which corresponds to a comparatively fuel-efficient operation of the internal combustion engine, there occurs an increased NOx emission of the internal combustion engine.

In stratified operation, a throttle valve in the intake region of the internal combustion engine is largely opened and the combustion is established essentially only by the injected fuel mass. Homogeneous operation approximately corresponds to the operating mode of internal combustion engines in which, in the usual method, fuel is injected into the intake region of the internal combustion engine. In homogeneous operation, the throttle valve is opened and closed as a function of the required torque, and the fuel quantity to be injected is determined as a function of the aspirated air mass.

The increased NOx emissions occurring in the first operating mode are no longer able to be made completely harmless by using a three-way catalytic converter.

Instead of this, NOx storage catalysts are used, which store the NOx being created in the stratified operation, from time to time.

German Patent Application No. DE 197 39 848 describes various operating methods for an internal combustion engine, in whose exhaust region an NOx adsorption catalyst is situated. Because of the finite storage capacity of the NOx adsorption catalyst, a regeneration of the NOx adsorption catalyst must be provided in between, which takes place because of a supply of hydrocarbons and/or carbon monoxide which are made available within the engine. Making available hydrocarbons/carbon monoxide comes about because, in the regeneration phase, the internal combustion engine is operated in a rich mode, the air ratio lambda being less than, or at most equal to 1.

Several possibilities for detecting the end of the NOx storing phase are described. One possibility provides a calculation of the NOx mass that is stored in the NOx adsorption catalyst, and this is calculated with the aid of a model of the NOx adsorption catalysts and known internal combustion engine operating characteristics variables.

Several possibilities for detecting the end of the regeneration phase are also described. One possibility provides the use of a lambda sensor situated downstream from the NOx adsorption catalyst, which detects a rich breakthrough that is occurring towards the end of the regeneration phase.

Such a possibility of detecting the end of the regeneration phase using a lambda sensor situated downstream from the NOx adsorption catalyst is furthermore described in German Patent No. DE 197 55 600. As soon as the lambda sensor detects a transition from a lean to a rich exhaust gas, this means that the NOx adsorption catalysts no longer makes available enough oxygen for the oxidation of the hydrocarbons or of the carbon monoxide, and that the NOx storage device has been largely regenerated.

The detection of the end of the regeneration presupposes a rich breakthrough, which is minimized by reducing the quantity of the reduction means respectively supplied in a time interval, with respect to that quantity, in response to whose supply in a preceding supply phase a reaction of the lambda sensor occurred.

In the reference book "Otto-Motor-Management/BOSCH", Vieweg Verlag (Publishing House), $1^{st}$ edition, 1998, pages 22-23, a broadband lambda sensor is described, having a sensor chamber which is connected to a gas compartment, in which the gas to be examined is located, via a diffusion barrier. Situated in the sensor chamber is an inner pump electrode which, together with an outer pump electrode and an electrolyte that is situated between the pump electrodes and conducts oxygen ions, forms a pump cell. Using the pump cell, oxygen ions of the gas can be pumped through the electrolyte out of, or into the sensor chamber. In addition to the pump cell, a measuring cell is provided that is disposed between the inner pump electrode and a reference-gas electrode, an electrolyte conducting oxygen ions likewise being situated between the inner pump electrode and the reference-gas electrode. The measuring cell corresponds to a Nernst cell, in which the potential difference forming in the thermodynamic equilibrium between the inner pump electrode and the air reference electrode is proportional to the logarithm of the ratio of the oxygen partial pressure of the gas in the sensor chamber and the oxygen partial pressure of the gas in the air reference.

The present invention is based on an object of providing a method for operating an internal combustion engine in whose exhaust region, in the direction of flow of the exhaust gas, a first broadband lambda sensor, an NOx adsorption catalyst and a second broadband lambda sensor are situated, in which the NOx adsorption catalyst cyclically stores the NOx emissions of the internal combustion engine and, within the scope of a regeneration, by the operation of the internal combustion engine using a rich, or at least a stoichiometric air fuel mixture, is regenerated, and of providing a device, for carrying out the method, which ensure great accuracy in the processing of the signal made available by the first broadband lambda sensor.

SUMMARY OF THE INVENTION

The method according to the present invention for operating an internal combustion engine in whose exhaust region, in the direction of flow of the exhaust gas, there are situated a first broadband lambda sensor which makes available a first lambda signal, an NOx adsorption catalyst and a second broadband lambda sensor which makes available a second lambda signal, in which the NOx adsorption catalyst cyclically stores the NOx emissions of the internal combustion engine and, within the scope of a nominal regeneration, by the operation of the internal combustion engine, using rich or at least a stoichiometric air/fuel mixture, is regenerated, provides, first of all, a stronger regeneration, compared to the nominal regeneration, of the NOx adsorption catalyst by the operation of the internal combustion engine using a rich/stoichiometric air/fuel mixture. At the end of the intensified regeneration at a still rich/stoichiometric air/fuel mixture, a plausibility check and/or a correction of the first lambda signal using the second lambda signal is undertaken.

The procedural approach according to the present invention makes it possible to detect an error or a deviation in the first sensor signal of the first broadband lambda sensor situated upstream of the NOx adsorption catalyst, which lies in the characteristics curve area for a rich air/fuel mixture, from the corresponding sensor signal of the second broadband lambda sensor situated downstream from the NOx adsorption catalyst. Especially in the case of rich air/fuel mixtures, different diffusion speeds of the exhaust gas components occur in layers situated within a broadband lambda sensor, or especially in the diffusion barrier, which leads to a shifting of the characteristics curve. For example, the faster diffusion speed of, for instance, hydrogen as compared to carbon monoxide leads to an output signal of the broadband lambda sensor that reflects a richer exhaust gas lambda than is actually present. By contrast, long chained hydrocarbons, because of their slow diffusion speed compared, for example, to carbon monoxide, shift the characteristics curve in the direction of lean.

Furthermore, the sensor signals of identical sensors may have a deviation of the characteristics curve, based on different installation relationships, which may at least be checked for plausibility, detected and/or corrected by the procedural approach according to the present invention.

The plausibility check/correction is possible if one makes the assumption that the first and second broadband lambda sensor have applied to them a comparable composition of exhaust gas components. It has turned out that a suitable point in time for comparing the lambda signals during operation of the internal combustion engine, using a rich air/fuel mixture or at most a stoichiometric air/fuel mixture comes about approximately towards the end of the regeneration of the NOx adsorption catalyst. In particular, one was able to show that a comparison of the lambda signals at the end of a regeneration, that was intensified compared to a nominal regeneration of the NOx adsorption catalyst, leads to the most reliable results. It is assumed that, because of the intensified regeneration, the setting of the thermodynamic equilibrium in the NOx adsorption catalyst is supported. The NOx adsorption catalyst is conditioned better.

The plausibility check/correction provides, for example, a comparison of the occurring signal ranges and/or, for example, a comparison of the signal dynamics. In the case of the signal dynamics, the absolute value of a change and/or an evaluation in time of a change may be involved. At least, within the scope of a plausibility check, deviations between the lambda signals may be detected, so that, in the light of the detected deviations, a correction may be carried out, if necessary.

A first measure for carrying out the regeneration, that is intensified compared to the nominal regeneration, provides that the temperature of the NOx adsorption catalyst is increased compared to the temperature at the nominal regeneration. Another measure which, if necessary, may additionally be provided, provides that more than one regeneration is provided in direct sequence for carrying out the intensified regeneration compared to the nominal regeneration. Another measure which, if necessary, may additionally be provided, provides that a time prolongation of the at least one regeneration is provided, for carrying out the intensified regeneration compared to the nominal regeneration.

According to one specific embodiment of the procedural manner according to the present invention, it is provided that the plausibility check/correction of the first lambda signal, using the second lambda signal, provides a comparison of the signal ranges of the lambda signals and/or a comparison of the signal dynamics.

According to one embodiment, it is provided that the plausibility check/correction of the first lambda signal, using the second lambda signal, provides at least a difference formation and at least one subsequent comparison to at least one threshold value. One embodiment provides that the correction of the characteristics curve of the first broadband lambda sensor be undertaken in the characteristics curve range for rich air/fuel mixture, in response to exceeding the threshold value. Alternatively, in response to the exceeding of the threshold value or in response to the exceeding of another threshold value, for instance, an error signal may be made available.

The device according to the present invention for operating the internal combustion engine first of all relates to a control unit which is configured to carry out the method.

The control unit, in particular, includes a diagnosis control for specifying at least the intensified regeneration, as well as a comparator which compares the lambda signals, made available by the two broadband lambda sensors, to each other and/or compares the difference of the two lambda signals to respectively at least one threshold value.

The control unit preferably includes at least one electrical memory in which the method steps are stored as a computer program.

DETAILED DESCRIPTION

Figure 1:
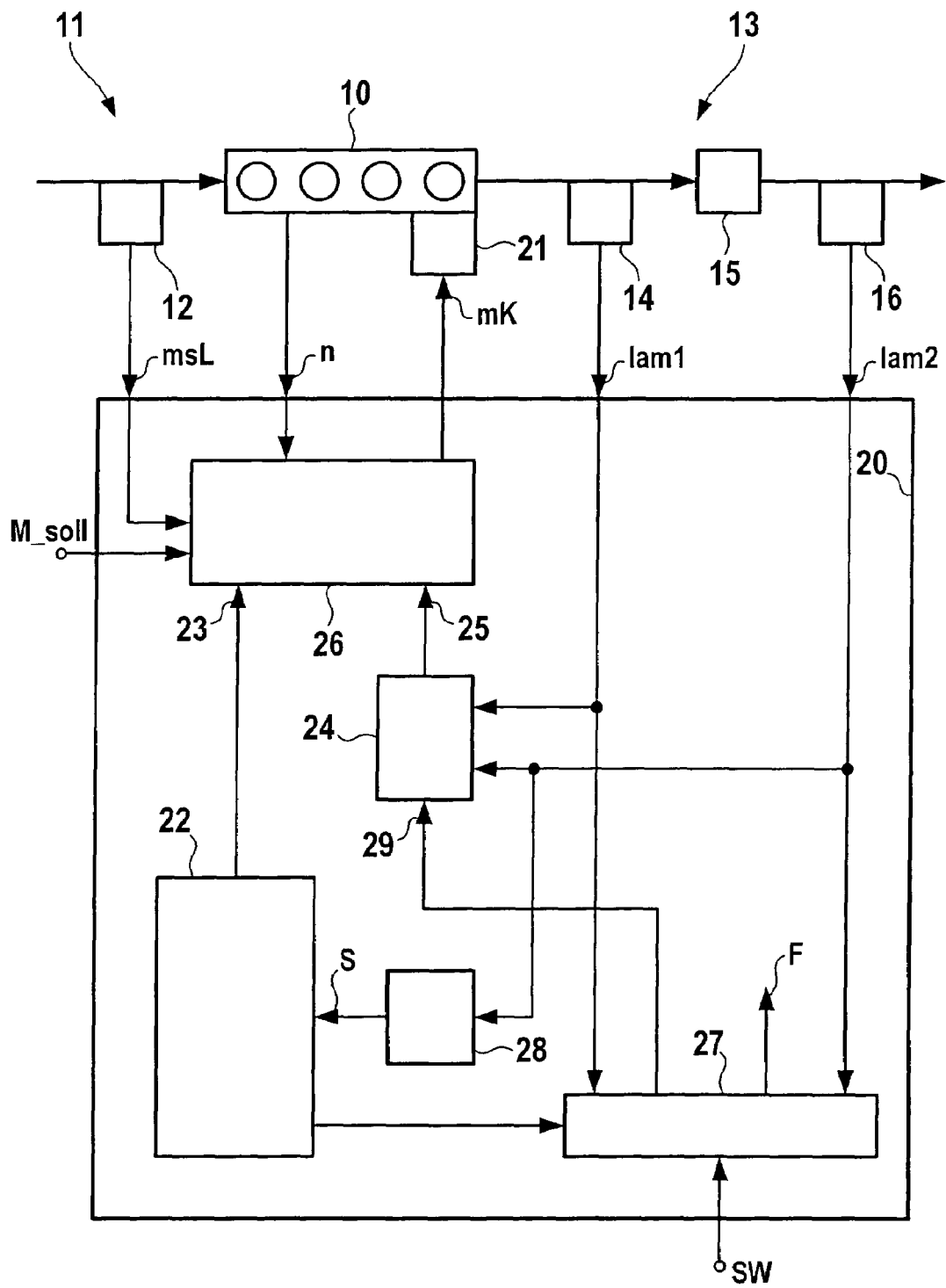
FIG. 1 shows a technical environment in which a method according to the present invention is executed.

FIG. 1 shows an internal combustion engine 10, in whose intake region 11 an air detection 12 is situated, and in whose exhaust region 13, in the direction of flow of the exhaust gas, a first broadband lambda sensor 14, an NOx adsorption catalyst 15 and a second broadband lambda sensor 16 are situated.

Air detection 12 sends an air signal msL, internal combustion engine 10 sends a rotary speed signal n, first broadband lambda sensor 14 sends a first lambda signal lam1 and second broadband lambda sensor 16 sends a second lambda signal lam2, all to control unit 20.

Also supplied to control unit 20 are a torque setpoint value M_soll, as well as a threshold value SW. Control unit 20 emits a fuel signal mK to a fuel_metering device 21.

Torque setpoint value M_soll, air signal msL, rotary speed signal n, a regeneration signal 23 made available by a diagnosis control 22, as well as a lambda actuating variable 25, made available by a lambda controller 24, are all made available to a fuel signal ascertainment device 26, which ascertains fuel signal mK. The first lambda signal made available by first broadband lambda sensor 14 is made available both to lambda controller 24 and to a comparator 27. Second lambda signal lam2, made available by second broadband lambda sensor 16, is also made available to both lambda controller 24 and comparator 27, and in addition, to a regeneration transmitting detector 28.

Comparator 27, to which threshold value SW is supplied, makes available a correction signal 29 to lambda controller 24, and emits an error signal F. Regeneration transmitting detector 28 makes available a stop signal S to diagnosis control 22.

Figures 2A, 2B:
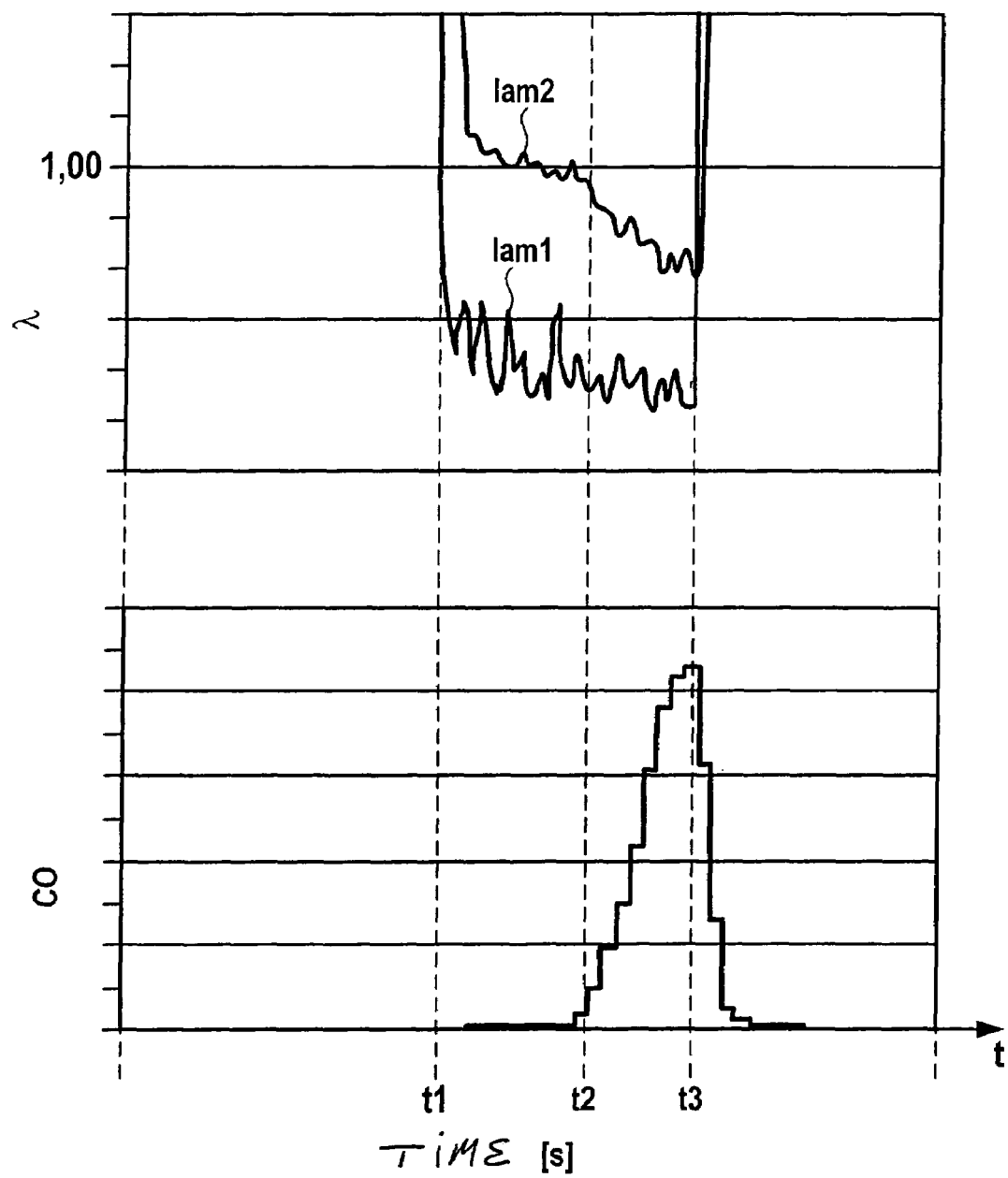
FIG. 2a shows lambda signals as a function of time.
FIG. 2b shows a carbon monoxide concentration as a function of time.

FIG. 2a shows the first and second lambda signal lam1, lam2 as a function of time, and FIG. 2b shows the carbon monoxide (CO) concentration, that occurs downstream from NOx adsorption catalyst 15, as a function of time t. At a first point in time t1, a regeneration begins. At a second point in time t2, a reagent breakthrough takes place, and at a third point in time t3 the regeneration is ended.

Figure 3:
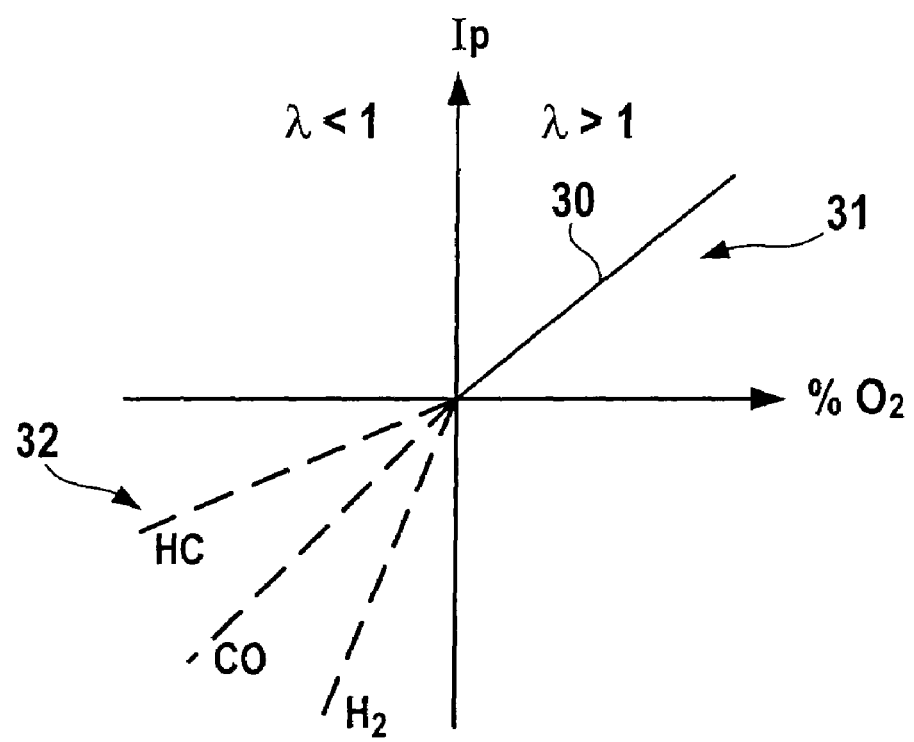
FIG. 3 shows a characteristics curve of a broadband lambda sensor.

FIG. 3 shows a characteristics curve 30 of broadband sensors 14,16 in which a pump current 1p is shown as a function of the oxygen concentration as $\%O_2$. In a first area 31 having oxygen excess (lambda>1) there is a clear characteristics curve 30. In a second area 32 having a lack of oxygen (lambda<1), the characteristics curve 30 is dependent upon the exhaust gas composition. If there is a predominant presence of carbon monoxide (CO), characteristics curve 30 shown in first area 31 continues in second area 32 without deviations. If there are, in particular, long-chained hydrocarbons (HC) present, a shift to lean of characteristics curve 30 takes place, and if hydrogen ($H_2$) is present, a shift to rich of characteristics curve 30 takes place.

According to the present invention, the method proceeds as follows:

Internal combustion engine 10, which is preferably a direct injecting Diesel or gasoline internal combustion engine, may at least be operated in a fuel-saving operating method, in which increased NOx emissions are able to occur. NOx adsorption catalyst 15 is provided to remove the NOx emissions, and it has a certain storage capacity. NOx adsorption catalyst 15 is cyclically loaded with NOx and regenerated.

The components required for carrying out the normal operation of NOx adsorption catalyst 15 are not shown in greater detail in FIG. 1. An NOx adsorption catalyst control may be provided within control unit 20, which calculates the untreated NOx emissions of the internal combustion engine and/or the liquid level of NOx adsorption catalyst 15 in the light of performance characteristics of internal combustion engine 10, such as air signal msL, engine speed signal n and/or fuel signal mK, and controls the regeneration accordingly. The end of the regeneration may additionally or alternatively be calculated. The control of NOx adsorption catalyst 15 may also be carried out, for example, with the aid of an NOx signal made available by an NOx sensor, that is not shown in greater detail, situated downstream from NOx adsorption catalyst 15.

The regeneration of NOx adsorption catalyst 15 may take place by supplying regenerating agents such as carbon monoxide (CO). In the example shown, the assumption is made that the regenerating agent is made available within the engine, by an at least stoichiometric, or, in particular, a rich operation of internal combustion engine 10, having an air ratio lambda of less than 1, or at most equal to 1.

For the purpose of specifying the air/fuel mixture, in particular, fuel signal mK is established by fuel signal ascertainment 26 in the light of lambda control variable 25, which is made available by lambda controller 24. Lambda controller 24 is in operation during the regeneration of NOx adsorption catalyst 15. However, it is also able to exert an influence on fuel signal mK during the specification of the lean air/fuel mixture.

In the exemplary embodiment shown, the end of the regeneration may be detected with the aid of a second lambda signal lam2, made available by second lambda sensor 16 that is situated downstream from NOx adsorption catalyst 15. Regeneration end detector 28 compares second lambda signal lam2 to a threshold value which might be about lambda=0.97.

The two lambda signals lam1 and lam2 are plotted in FIG. 2a as a function of time t. In a time range before first point in time t1, it is assumed that a lean air/fuel mixture, corresponding to an air ratio of lambda being greater than, for instance, 1.05 is being supplied to internal combustion engine 10. At first point in time t1, regeneration of the NOx adsorption catalyst 15 begins, which is initiated by the air/fuel mixture being supplied to internal combustion engine 10 being enriched, so that an exhaust gas lambda of, for instance, 0.95 or at least an exhaust gas lambda of 1.00 is obtained, the latter corresponding to stoichiometric operation.

After the beginning of the regeneration, at first point in time t1, second lambda signal lam2 goes back from air ratio lambda of, for instance, greater than 1.05 to a value of at least approximately 1.00. During the regeneration, NOx adsorption catalyst 15 sets, at least approximately, a thermodynamic equilibrium, as long as the stored NOx is being desorbed. At second point in time t2, the regeneration approaches the end at which a breakthrough of the regeneration agent (CO) begins to appear. The corresponding reduction in second lambda signal lam2 below the value 1.00 is drawn upon in end of regeneration detector 28 for detecting the end of the regeneration. The threshold value may, for example, be established in such a way that an incipient reagent breakthrough is detected as briefly as possible after second point in time t2. In the example shown, the end of the regeneration is supposed to be detected at third point in time t3.

If second lambda signal lam2 undershoots the threshold value, end of regeneration detector 28 emits stop signal S, which is supplied to an NOx adsorption catalyst control, that is not shown in greater detail, or, for instance, directly to fuel signal ascertainment 26 for changing the air/fuel mixture.

Based on different gases in the exhaust gas, a shifting of characteristics curve 30 of broadband lambda sensors 14, 16 may take place in second region 32. FIG. 3 shows, first of all, a shift to rich of characteristics curve 30 based on hydrogen ($H_2$), which may be present in the rich exhaust gas at an air ratio of less than 1. Based on the diffusion speed, that is greater compared to that of carbon monoxide (CO), in layers and/or diffusion barriers of broadband lambda sensors 14, 16, which are designed according to the related art named at the outset, more oxygen is used up in the sensor chamber than in the case of an exhaust gas which, for instance, contains less hydrogen ($H_2$). Because of the greater oxygen usage in the sensor chamber, a pump current Ip, that is greater in absolute value, is required, from which lambda signal lam1, lam2 is obtained. A greater negative pump current Ip corresponds to a lambda signal lam1, lam2 shifted to rich.

FIG. 3 also shows a shift to lean of characteristics curve 30 based on hydrocarbons (HC), which may also be present in the rich exhaust gas at an air ratio of less than 1. Based on the diffusion speed, that is lower compared to that of carbon monoxide (CO), for instance, in layers and/or diffusion barriers of broadband lambda sensors 14, 16, which are designed according to the related art named at the outset, less oxygen is used up in the sensor chamber than in the case of an exhaust gas which, for instance, contains a lesser quantity of hydrocarbons (HC). Because of the lesser oxygen usage in the sensor chamber, a pump current Ip that is less in absolute value is required, from which lambda signal lam1, lam2 is obtained. A lower negative pump current Ip corresponds to a lambda signal lam1, lam2 shifted to lean.

As a suitable point in time for plausibility checking, correcting, a point in time near the end of regeneration of the NOx adsorption catalyst 15 has proven itself, corresponding to points in time t2, t3. It was proven experimentally that second lambda signal lam2, made available by second broadband lambda sensor 16, corresponds with great accuracy to the actual exhaust gas lambda if an intensified regeneration of NOx adsorption catalyst 15, compared to a nominal regeneration in normal regeneration operation of NOx adsorption catalyst 15, is undertaken. NOx adsorption catalyst 15 is conditioned better by the intensified regeneration. It is assumed that therefore a better setting of the thermodynamic equilibrium is achieved.

The intensified regeneration, compared to the nominal generation, of the NOx adsorption catalyst may be caused by diagnosis control 22, using regeneration signal 23, for instance, in that the temperature of NOx adsorption catalyst 15 is increased. Regeneration signal 23 may, for instance, cause a measure for increasing the catalyst temperature. A suitable measure for heating NOx adsorption catalyst 15 provides, for instance, that combustible exhaust gas components and oxygen are simultaneously present in NOx adsorption catalyst 15, which react exothermally at a catalytic surface inside adsorption catalyst 15. Another measure, for example, provides increasing the exhaust gas temperature of internal combustion engine 10 for the passive heating of adsorption catalyst 15.

An alternative measure, which may possibly be provided in addition, provides for an extension of the nominal regeneration for carrying out the intensified regeneration. After the occurrence of stop signal S, which is made available by end of generation detector 28, diagnosis control 22, using regeneration signal 23, is able to cause fuel signal ascertainment 26 to specify the rich air/fuel mixture of internal combustion engine 10 for another specified extension period of, for instance, a few seconds.

An additional alternative measure, which may possibly be additionally provided, provides a plurality, at least 2 regenerations in direct sequence in time, for carrying out the intensified regeneration of NOx adsorption catalyst 15, the operational conditions of the individual regenerations preferably corresponding to the operating conditions during the nominal regeneration.

After the carrying out of the intensified regeneration using at least one of the described measures, second lambda signal lam2 agrees better with the actual exhaust gas lambda than without an intensified regeneration.

After an intensified regeneration, at a point in time at which internal combustion engine 10 still has supplied to it a rich/stoichiometric air/fuel mixture, the plausibility check/correction takes place. The plausibility check/correction provides, for example, a comparison of the occurring signal ranges and/or, for example, a comparison of the signal dynamics. In the case of the signal dynamics, the absolute value of a change and/or an evaluation in time of a change of lambda signals lam1, lam2 may be involved. Within the scope of the plausibility check, at least deviations between lambda signals lam1, lam2 may be detected. The plausibility check may take place in comparator 27.

Lambda signals lam1, lam2 may be compared to each other in comparator 27. Comparator 27 is able to compare lambda signals lam1, lam2 directly to each other and, for example, form the difference. The difference may be compared, for instance, to threshold value SW. Provided that threshold value SW is exceeded, if, according to that, a correction of first lambda signal lam1 is required, correction signal 29 is made available which, for instance, in lambda controller 24 is drawn upon, for example, for influencing first lambda signal lam1.

Using threshold value SW, a limiting value may be specified, at the exceeding of which lambda signal lam1 made available by first broadband lambda sensor 14 is considered to be no longer reliable in second area 32 of characteristics line 30. Thereupon, comparator 27 is able to emit error signal F, which, for instance, may be displayed and/or stored in an error memory that is not shown in more detail.

What is claimed is:

1. A method for operating an internal combustion engine, in whose exhaust region, in a direction of flow of an exhaust gas, there are situated a first broadband lambda sensor which makes available a first lambda signal, an NOx adsorption catalyst, and a second broadband lambda sensor which makes available a second lambda signal, the NOx adsorption catalyst cyclically storing NOx emissions of the internal combustion engine, the method comprising:

regenerating the NOx adsorption catalyst within the scope of a nominal regeneration by operation of the internal combustion engine using at least one of (a) a rich air/fuel mixture and (b) at least a stoichiometric air/fuel mixture;

carrying out an intensified regeneration, compared to the nominal regeneration, of the NOx adsorption catalyst by the operation of the internal combustion engine using a rich/stoichiometric air/fuel mixture; and at an end of the intensified regeneration at a still rich/stoichiometric air/fuel mixture, undertaking at least one of a plausibility check of the first lambda signal using the second lambda signal and a correction of the first lambda signal using the second lambda signal.

2. The method according to claim 1, wherein a temperature of the NOx adsorption catalyst is increased for carrying out the intensified regeneration compared to the nominal regeneration.

3. The method according to claim 1, wherein more than one regeneration is provided in direct sequence for carrying out the intensified regeneration compared to the nominal regeneration.

4. The method according to claim I, wherein a time extension of at least one regeneration is provided for carrying out the intensified regeneration compared to the nominal regeneration.

5. The method according to claim 1, wherein the plausibility check of the first lambda signal using the second lambda signal provides at least one difference formation and at least one subsequent comparison to at least one threshold value.

6. The method according to claim 1, wherein the plausibility check/correction of the first lambda signal using the second lambda signal provides a comparison of at least one of (a) signal ranges and (b) signal dynamics.

7. The method according to claim 1, further comprising making available an error signal in response to a prespecified deviation of the first lambda signal from the second lambda signal.

8. The method according to claim 1, further comprising undertaking a correction of a characteristics line of the first broadband lambda sensor in response to a prespecified deviation of the first lambda signal from the second lambda signal.

9. A device for operating an internal combustion engine, in whose exhaust region, in a direction of flow of an exhaust gas, there are situated a first broadband lambda sensor which makes available a first lambda signal, an NOx adsorption catalyst, and a second broadband lambda sensor which makes available a second lambda signal, the NOx adsorption catalyst cyclically storing NOx emissions of the internal combustion engine, the device comprising at least one control unit for performing the following:

regenerating the NOx adsorption catalyst within the scope of a nominal regeneration by operation of the internal combustion engine using at least one of (a) a rich air/fuel mixture and (b) at least a stoichiometric air/fuel mixture;

carrying out an intensified regeneration, compared to the nominal regeneration, of the NOx adsorption catalyst by the operation of the internal combustion engine using a rich/stoichiometric air/fuel mixture; and at an end of the intensified regeneration at a still rich/stoichiometric air/fuel mixture, undertaking at least one of a plausibility check of the first lambda signal using the second lambda signal and a correction of the first lambda signal using the second lambda signal.

10. The device according to claim 9, wherein the control unit includes a diagnosis control and a comparator for comparing the first and second lambda signals.

* * * * *